United States Patent
Quin et al.

(10) Patent No.: US 10,476,993 B2
(45) Date of Patent: Nov. 12, 2019

(54) METHOD AND SYSTEM FOR TRANSACTION DIAGNOSTICS

(71) Applicant: BlackBerry Limited, Waterloo (CA)

(72) Inventors: Spencer Leavitt George Quin, Kitchener (CA); Thomas Owen Parry, Cambridge (CA); Bradley Alfred Fach, Cambridge (CA); Hashim Mohammad Qaderi, Kitchener (CA)

(73) Assignee: BlackBerry Limited, Waterloo (CA)

(*) Notice: Subject to any disclaimer, the term of this patent is extended or adjusted under 35 U.S.C. 154(b) by 689 days.

(21) Appl. No.: 14/824,841

(22) Filed: Aug. 12, 2015

(65) Prior Publication Data

US 2017/0048119 A1    Feb. 16, 2017

(51) Int. Cl.
| | |
|---|---|
| *H04L 29/06* | (2006.01) |
| *H04L 12/26* | (2006.01) |
| *H04L 12/24* | (2006.01) |

(52) U.S. Cl.
CPC .......... *H04L 69/22* (2013.01); *H04L 41/0604* (2013.01); *H04L 41/069* (2013.01); *H04L 41/0631* (2013.01); *H04L 43/08* (2013.01)

(58) Field of Classification Search
CPC ......... H04L 43/08; H04L 69/22; G06F 17/30; G06F 17/30286
See application file for complete search history.

(56) References Cited

U.S. PATENT DOCUMENTS

| | | | | |
|---|---|---|---|---|
| 7,003,781 | B1* | 2/2006 | Blackwell | G06F 11/3495 719/327 |
| 7,613,815 | B1* | 11/2009 | Prakash | H04L 67/28 707/999.1 |
| 8,175,908 | B1* | 5/2012 | Anderson | G06Q 30/0201 705/7.29 |
| 8,937,942 | B1* | 1/2015 | Li | H04L 67/1097 370/386 |
| 9,547,638 | B2* | 1/2017 | Studer | G06F 8/00 |
| 9,569,326 | B2* | 2/2017 | Gagliardi | G06F 11/3006 |
| 2005/0049924 | A1* | 3/2005 | DeBettencourt | H04L 43/028 705/21 |
| 2008/0025230 | A1* | 1/2008 | Patel | H04L 41/5022 370/252 |
| 2008/0114670 | A1* | 5/2008 | Friesen | G06Q 40/00 705/35 |
| 2008/0263064 | A1* | 10/2008 | Choi | G06F 16/1737 |

(Continued)

OTHER PUBLICATIONS

International Searching Authority, International Search Report for Application No. PCT/CA2016/050934, dated Oct. 20, 2016.

(Continued)

*Primary Examiner* — Lashonda T Jacobs
(74) *Attorney, Agent, or Firm* — Moffat & Co

(57) ABSTRACT

A method at a network element for monitoring, at the network element, transactions between the network element and at least one client device; applying rules to each transaction; and performing at least one of parsing, storing, or discarding each transaction based on the rules. Further, a method at a client device including storing a session identifier; generating a transaction message; adding the session identifier and a transaction identifier to the transaction message; and sending the transaction message with the session identifier and transaction identifier to a server.

12 Claims, 7 Drawing Sheets

(56) References Cited

U.S. PATENT DOCUMENTS

| | | | |
|---|---|---|---|
| 2009/0105991 A1 | 4/2009 | Ramacher et al. | |
| 2010/0145978 A1* | 6/2010 | Anashkin | G06F 16/2358 |
| | | | 707/769 |
| 2010/0211554 A1* | 8/2010 | Reid | G06F 16/2315 |
| | | | 707/703 |
| 2010/0318858 A1* | 12/2010 | Essawi | G06F 16/21 |
| | | | 714/49 |
| 2011/0066891 A1 | 3/2011 | Wechsler et al. | |
| 2011/0154040 A1* | 6/2011 | Bheemanna | H04W 12/0017 |
| | | | 713/170 |
| 2013/0080407 A1* | 3/2013 | Levow | G06F 16/2308 |
| | | | 707/692 |
| 2014/0006875 A1* | 1/2014 | Vedula | G06F 11/3068 |
| | | | 714/45 |
| 2014/0207592 A1* | 7/2014 | Kavis | G06Q 40/12 |
| | | | 705/21 |
| 2014/0372338 A1* | 12/2014 | Kim | G06Q 30/0282 |
| | | | 705/347 |
| 2015/0058074 A1* | 2/2015 | Fransen | G06Q 30/0201 |
| | | | 705/7.29 |
| 2017/0264505 A1* | 9/2017 | Kolluru | H04L 67/22 |

OTHER PUBLICATIONS

International Bureau of WIPO, International Preliminary Report on Patentability for Application No. PCT/CA2016/050934 dated Feb. 22, 2018.

* cited by examiner

210

| Rule | If Conditions Met |
|---|---|
| Rule 1 | Perform Sub-rules |
| Sub-Rule 1a | Store in first data store |
| Sub-Rule 1b | Split data, perform rules on each data sub-set |
| Default | Store in second data store |
| Rule 2 | Store in third data store |
| Rule 3 | Store in first data store |
| Default | Store in second data store |

Transaction Rules Table

METHOD AND SYSTEM FOR TRANSACTION DIAGNOSTICS

FIELD OF THE DISCLOSURE

The present disclosure relates to systems for the resolution of problems for a service, and in particular relates to the capture, storing and retrieval of data to enable resolution of problems in a service.

BACKGROUND

In a typical server client scenario, logging functionality within applications will produce log files that may be used for debugging. Such logging functionality typically provides a logging string to a particular file or location for each separate component of a client/server architecture. An administrator then trying to resolve an issue within that client/server architecture will need to look at a variety of logs in order to determine the root cause of the issue. Such administrator will typically need expertise to locate and isolate the problems or issues, and the resolving of these issues may take weeks to gather enough information to determine the root cause.

Further, in many cases the logging functionality only captures limited data, leading to delays in resolving customer issues.

A critical part of providing a service to customers is enabling them to reduce the time to resolve their problems.

BRIEF DESCRIPTION OF THE DRAWINGS

The present disclosure will be better understood with reference to the drawings, in which.

DETAILED DESCRIPTION OF THE DRAWINGS

The present disclosure provides a method at a network element comprising: monitoring, at the network element, transactions between the network element and at least one client device; applying rules to each transaction; and performing at least one of parsing, storing, or discarding each transaction based on the rules.

The present disclosure further provides a network element comprising: a processor; and a communications subsystem, wherein the network element is configured to: monitor transactions between the network element and at least one client device; apply rules to each transaction; and perform at least one of parsing, storing, or discarding each transaction based on the rules.

The present disclosure further provides a method at a client device comprising: storing a session identifier; generating a transaction message; adding the session identifier and a transaction identifier to the transaction message; and sending the transaction message with the session identifier and transaction identifier to a server.

The present disclosure further provides a client device comprising: a processor; and a communications subsystem, wherein the client device is configured to: store a session identifier; generate a transaction message; add the session identifier and a transaction identifier to the transaction message; and send the transaction message with the session identifier and transaction identifier to a server.

The present disclosure, in one embodiment, captures all device and server transaction logs independently from the operational server or device logs. Such device and server transaction logs are then indexed on all dynamic fields in the documents, which allows for fast searching.

Such transaction logs may then be stored for future reference. It is possible that an administrator may be able to see the entire transaction history of the device throughout its lifetime.

Further, the present disclosure provides that information can be isolated and enhanced to draw attention to the most relevant fields in the document for a particular problem at hand. By capturing server and client request and responses, an administrator can use the methods and systems of the present disclosure to reduce resolution times from weeks to minutes in many cases.

Figure 1:
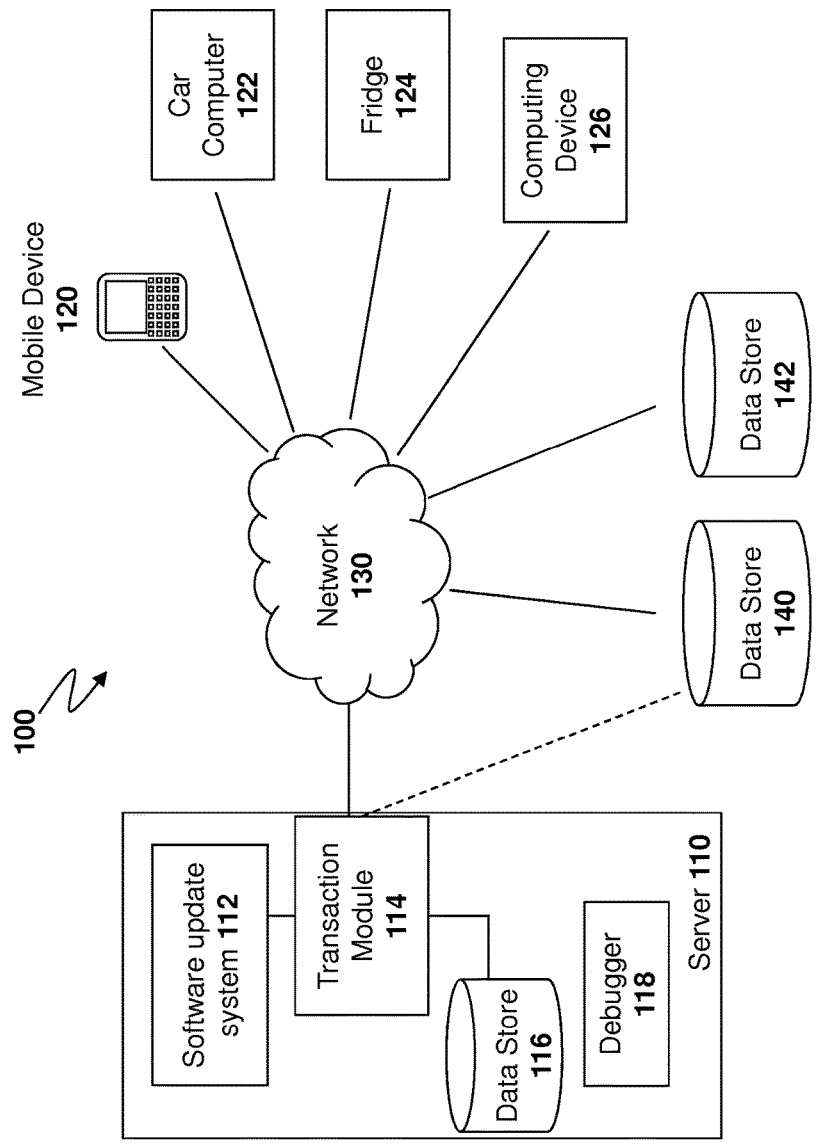
FIG. 1 is a block diagram showing an example system architecture for use with the present embodiments.

In particular, reference is now made to FIG. 1. FIG. 1 shows a system 100 in which a server 110 may provide various data or functionality for a series of client devices. In particular, various client devices are shown in the example of FIG. 1, and include a mobile device 120, an automobile or car computer 122, a fridge or appliance 124, or a general computing device 126. However, this list of client computing devices is merely meant to be an example and other client devices could interact with server 110. Thus the present disclosure is not limited to any particular type of client device.

In the embodiment of FIG. 1, server 110 serves as a software upgrade server having a software upgrade system 112. However, this is merely meant as an example and server 110 could equally be used for other purposes. For example, server 110 may be an e-mail server providing e-mails to the devices, a provisioning server to provision various software or data to devices, a data storage server, a mobility device management server, among other options.

In the embodiment of FIG. 1, a transaction module 114 is used to capture and store transaction information in accordance with the embodiments described below. Transaction module 114 may be on the communication path between software update system 112 and client devices 120, 122, 124 and 126. Alternatively, transaction module 114 may be configured to monitor communications between a client and the server.

Server 110 may communicate with client devices 120, 122, 124 or 126 through a network 130. For example, network 130 may be the internet in one embodiment. However, in other embodiments the server 110 may communicate with the client devices through other networks such as private networks or other wired or wireless networks. Further, in some instances the client devices may be connected directly to server 110.

In the example of FIG. 1, all transactions between a client device such as mobile device 120 and software update system 112 flow through transaction module 114, which may capture and record the transactions in their entirety. However, in order to allow for the data to be easily retrieved and associated with other data, transaction module 114 may utilize a rules table to determine how the data should be handled and where it should be stored.

In one embodiment, the storage may be local to server 110, as shown by data store 116. In one embodiment, data store 116 may be a database.

In other embodiments, the data may be stored in remote data stores such as database 140 or database 142, which may be accessed via network 130 or through other methods.

Data stores 116, 140 and 142 may include an indexable search engine, which may consist of a persistent store with a searchable index. Thus, in one embodiment, the data sent to data stores 116, 140 and 142 may be parsed for the searchable index and may not require any special or predetermined data structure prior to being sent to such data stores.

In one embodiment, the transaction module 114 captures and records every transaction between a client and the server 110. In this way, someone later debugging such transactions can see exactly what was sent to the client device and what was received at the server.

Figure 2:
FIG. 2 is a block diagram showing an example rules table.

Reference is now made to FIG. 2, which shows a rules table 210 which may be utilized with the transaction module 114 of FIG. 1.

In particular, as seen in the rules table 210, a series of rules and sub-rules may be defined for the transaction module 114 to apply to any transaction data that passes through the transaction module. In the example of FIG. 2, table 210 includes rules and sub-rules. However, various levels of rules could be implemented and the present disclosure is not meant to be limited to any number of sublevels of rules.

In one embodiment, the rules may be processed in a particular order. However, in other embodiments the rules may be implemented simultaneously or in parallel.

Thus, with regard to the example of FIG. 2, if the rules are being performed sequentially, then the first rule (rule 1) is checked. If the conditions for the rule are met then the transaction module 114 performs the sub-rules in accordance with table 210. The processing proceeds to sub-rule 1A in which, if the conditions are met, the data is stored in the first data store. If the rule in sub-rule 1A is not met, then the process may proceed to sub-rule 1B in which the data is split and the rules in the rules table are then performed on each data subset from the split data.

Further, a "default" rule may be provided within the sub-rules if the conditions for the first sub-rule and the second sub-rule are not met. In this case, the data is stored in a second data store.

Table 210 further includes a second rule in which data is stored in a third data store, a third rule which data is stored in a first database and a default rule in which, if none of the conditions are met, then the data is stored in the second data store.

The table of FIG. 2 is merely an example. Various rules and sub-rules could be defined for various functionality. For example, the rules may be used to segregate data. Thus, the data could be split into categories, functional groups or types and stored in different databases, data stores or file locations pursuant to various rules.

Other rules could include the size of the data, where if the data is above a certain size then the data is stored in a first location and if it is below a certain size it is stored in a second location.

The rules could specify actions based on data type. For example, general logs could be stored in a first location and client server transactions could be stored in a second location.

Thus, the rules decide how the data is chopped up, where it is sent and whether or not it should be sent at all.

In one embodiment, the processing of the rules within the transaction module 114 stores every byte of information. In this case, the body and header may be stored in separate locations but may be linked together. For example, a category tag may be associated between the header and the body, wherein a debugger 118 as seen in FIG. 1 may then be utilized to link the various pieces of data together.

Thus, referring to FIG. 1, data store 116 may be used for the header information which may provide, in some embodiments, faster access to data. Thus, a first level of searching for debugger 118 may be within the data in data store 116. Once data is isolated that may be the cause of the problem on the client devices 120, 122, 124 or 126 then the debugger 118 may look to a session identifier, which may or may not be globally unique, in order to find associated data within data store 140 or 142. Debugger 118 therefore has the ability to perform a multi-level search to isolate data more quickly to determine the root cause of the issue on the client device.

As used in the present disclosure, a session identifier may be any lifecycle tracking identifier to identify the messages needed to accomplish a task. Thus, for example, on a software update from a server to a client device, thirty messages may be needed. Each of these messages may include a transaction identifier. However, the thirty messages are related to the task of providing a software update, and thus a session identifier may also be included with each of these messages. In this way, debugger 118 can tie the various transaction messages together.

In one embodiment, Table 210 from FIG. 2 may be dynamically updated. Thus, an administrator may wish to change the rules at any time, for example to isolate certain transaction types. In this case, the administrator may add a high priority rule to the rules table which will flag every transaction that has certain characteristics. Such rule may be placed temporarily into the rule table and thus be utilized to track all transactions of a particular transaction type. Other examples of dynamically changing the rule table would be apparent to those skilled in the art.

Figure 3:
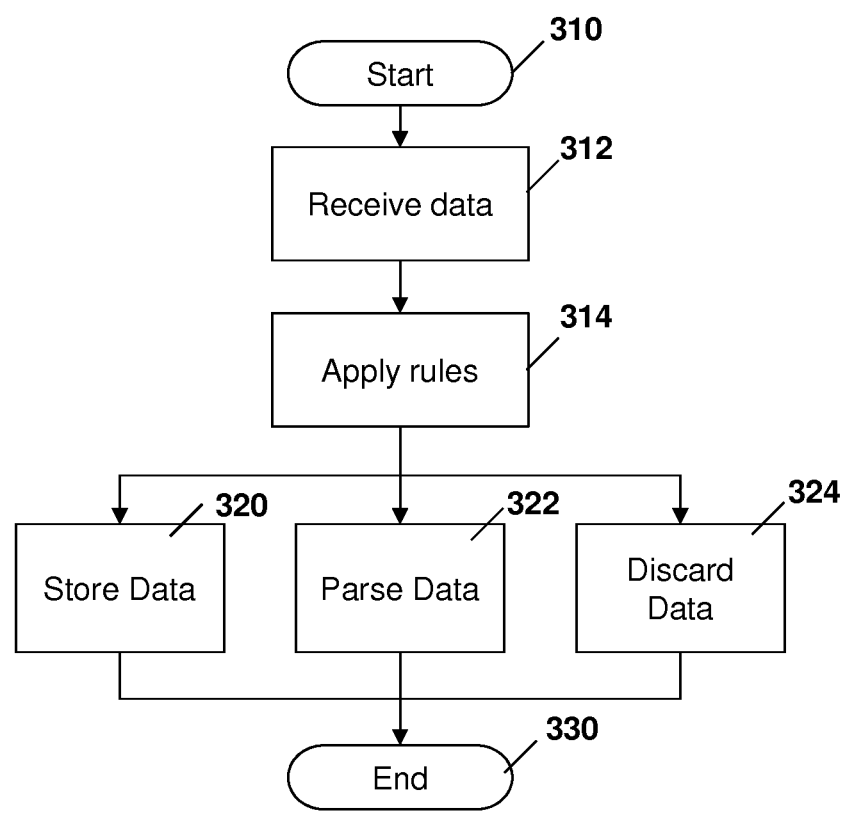
FIG. 3 is a process diagram for storing data in accordance with one embodiment of the present disclosure.

Reference is now made to FIG. 3, which shows a process for the processing of data at transaction module 114. In particular, the process starts at block 310 and proceeds to block 312 in which the transaction module receives data. Such data may be received either from a client device such as client 120, 122, 124 or 126 from FIG. 1. Alternatively such data may be received from a module on the server 110 such as the software update system 112.

From block 312, the process proceeds to block 314 in which the rules from Table 2 are applied.

The application of the rules may lead to the transaction module performing various tasks including one or more of storing data as shown by block 320, parsing data as shown by block 322 or discarding the data as shown by block 324. However, blocks 320, 322 and 324 are not meant to be limiting to the types of transactions or processing that may be performed by transaction module 114. Further, various functionality from the blocks may be combined. For example, the data may be parsed at block 322 and then stored in various locations at block 320. Other examples are possible.

From blocks 320, 322 and 324 the process proceeds to block 330 and ends.

Once the data is allocated into the various storage locations, a debugger 118 from FIG. 1 may be utilized to retrieve the data and to view all transactions associated with such data. As indicated above, a tracking or session identifier or other unique identifier may be associated with each record and may be utilized to dynamically link the data together. For example, such identifier may be provided to a client during a transaction in which the client communicates with the server and a session identifier is provided back to the client. Such session identifier may then be utilized for future transactions with the client for a particular time period.

Figure 4:
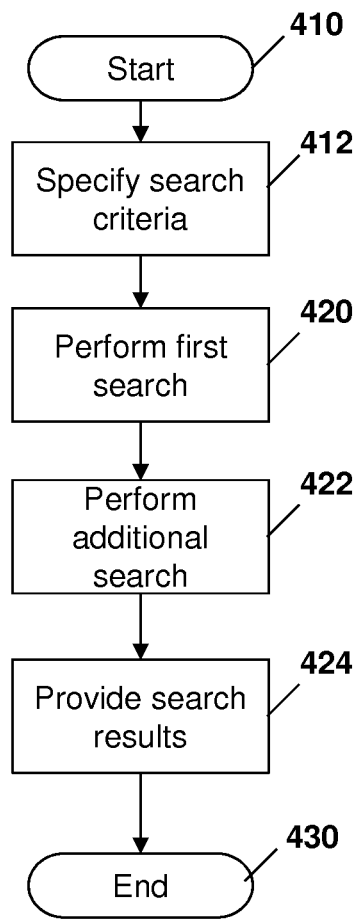
FIG. 4 is a process diagram for retrieving data in accordance with one embodiment of the present disclosure.

In the debugger 118, a process is provided with regard to FIG. 4. In particular, the process starts at block 410 and proceeds to block 412 in which the conditions for the search are specified. As indicated above, a multi-level search may be provided. For example, the search may include time parameters such as start and end time, device identifiers, session identifiers, transaction identifiers, among other factors. Such search may then lead to the retrieval of some information such as header information that matches the search criteria. Such information may then be linked to other information in other files, databases or data stores. In this way, the process of FIG. 4 proceeds to block 420 and retrieves the initial information and then proceeds to block 422 and retrieves additional information which is provided to an administrator of server 110.

The administrator of server 110 may then quickly mine into the data and isolate the appropriate data in order to isolate and find the problem with the client device transactions.

The process then proceeds to block 424 in which the search results are provided to the administrator and proceeds to block 430 and ends.

In practice, the process of FIG. 4 may be used to find appropriate transactions and data associated with a client device to quickly isolate any issues with the device, server, or communications between the device and server.

Figure 5:
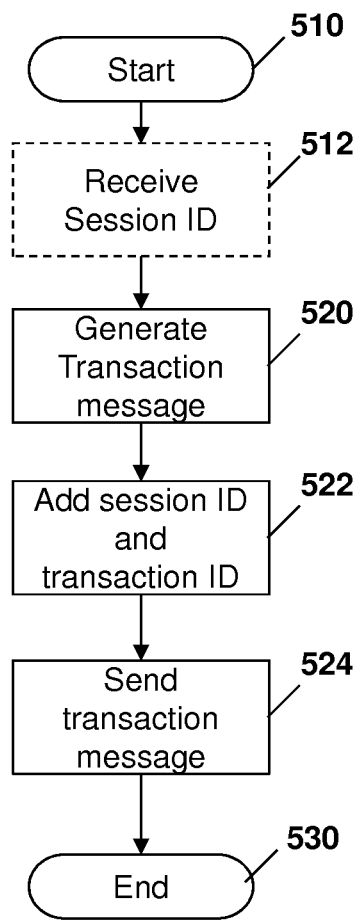
FIG. 5 is a process diagram showing the addition of a session identifier and transaction identifier to a transaction message at either a server or client device.

In order to ensure that the messages within each task are linked together, a task or session identifier is added to the transaction messages by both the server and the client. Reference is now made to FIG. 5, which shows a process at either the client device or the server which may be utilized to add such session identifier to the message for future retrieval purposes.

In particular, the process of FIG. 5 starts at block 510 and proceeds to block 512 in which a session identifier is received. Block 512 is an optional element, as the session identifier does not need to be received prior to each transaction, but merely prior to, or at the beginning of, a task being started. Further, the session identifier may be generated by either the client device or the server. In some embodiments, if the client device starts a transaction but is not the designated party generating the session identifier then the session identifier may be received and stored at the client device in the next message from the server.

Once the session identifier for the task is allocated and stored at the server and client device, the process may then proceed to block 520 in which a transaction message is generated. Such transaction message may be an originating message or may be a response to a previous transaction message.

The process then proceeds to block 522 in which the session identifier, as well as a transaction identifier, is added to the message that is generated at block 520.

The process then proceeds to block 524 in which the transaction message, along with the session and transaction identifiers, is sent from one of the server and client device to the other of the server and client device.

From block 524 the process proceeds to block 530 and ends.

The above therefore provides for a session identifier to be associated with all transaction messages for a particular task and allows debugger 118 to associate the data within the task for debugging purposes.

Figure 6:
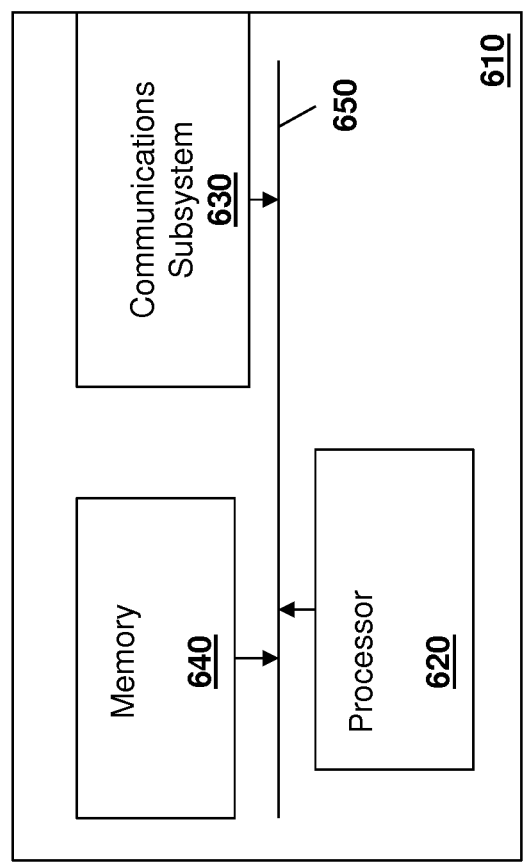
FIG. 6 is a simplified block diagram of an example network element.

The servers and network elements in the embodiments above can be any network element, or part of any network element, including various network servers. Reference is now made to FIG. 6, which shows a generalized network element.

In FIG. 6, network element 610 includes a processor 620 and a communications subsystem 630, where the processor 620 and communications subsystem 630 cooperate to perform the methods of the embodiments described above.

Processor 620 is configured to execute programmable logic, which may be stored, along with data, on network element 610, and shown in the example of FIG. 6 as memory 640. Memory 640 can be any tangible, non-transitory, storage medium.

Alternatively, or in addition to memory 640, network element 610 may access data or programmable logic from an external storage medium, for example through communications subsystem 630.

Communications subsystem 630 allows network element 610 to communicate with other network elements. Examples of protocols for communication subsystem 630 include cellular, Ethernet, WiFi, WiLAN, among others.

Communications between the various elements of network element 610 may be through an internal bus 650 in one embodiment. However, other forms of communication are possible.

Further, the above may be implemented by any mobile device. One exemplary device is described below with regard to FIG. 7.

Mobile device 700 is typically a two-way wireless communication device having voice and data communication capabilities. Mobile device 700 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a mobile device, or a data communication device, as examples.

Where mobile device 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of mobile device 700. A mobile may require a removable user identity module (RUIM) or a subscriber identity module (SIM) card in order to operate on a network. The SIM/RUIM interface 744 is normally similar to a card-slot into which a SIM/RUIM card can be inserted and ejected. The SIM/RUIM card can have memory and hold many key configurations 751, and other information 753 such as identification, and subscriber related information.

When required network registration or activation procedures have been completed, mobile device 700 may send and receive communication signals over the network 719.

Figure 7:
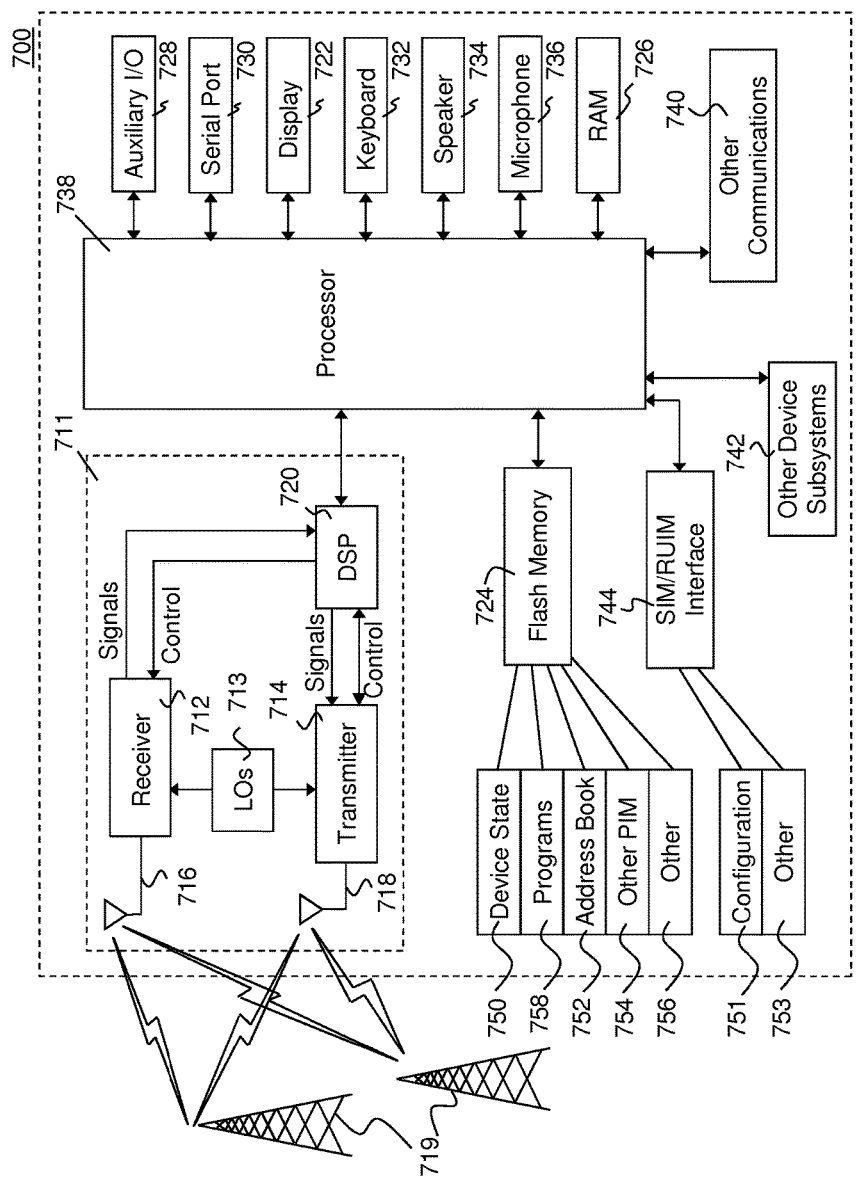
FIG. 7 is a block diagram of an example user equipment for use with the embodiments of the present disclosure.

As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like. ND conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, among others, in conjunction with the display 722 and possibly an auxiliary I/O device 6728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a network element comprising:
    monitoring, at the network element, transactions between the network element and at least one client device;
    applying rules to each transaction; and
    performing at least one of parsing, storing, or discarding each transaction based on the rules;
    wherein the storing is done at a data store that adds an index to transaction data;
    wherein the parsing splits the transaction into a header and body;
    wherein the storing stores the header in a first data store in association with a session identifier and stores the body in a second data store in association with the session identifier; and
    wherein the session identifier allows to link the header and the body.

2. The method of claim 1, wherein the data store is local to the network element.

3. The method of claim 1, wherein the data store is remote from the network element.

4. The method of claim 1, wherein the session identifier is globally unique.

5. The method of claim 1, further comprising retrieving the data from a plurality of data stores based on a multi-level search.

6. The method of claim 1, wherein the rules are dynamically configurable.

7. A network element comprising:
    a processor; and
    a communication subsystem,
    wherein the network element is configured to:
        monitor transactions between the network element and at least one client device;
        apply rules to each transaction; and
        perform at least one of parsing, storing, or discarding each transaction based on the rules;
        wherein the storing is done at a data store that adds an index to transaction data;
        wherein the parsing splits the transaction into a header and body;
        wherein the storing stores the header in a first data store in association with a session identifier and stores the body in a second data store in association with the session identifier; and
        wherein the session identifier allows to link the header and the body.

8. The network element of claim 7, wherein the data store is local to the network element.

9. The network element of claim 7, wherein the data store is remote from the network element.

10. The network element of claim 7, wherein the session identifier is globally unique.

11. The network element of claim 7, wherein the network element is further configured to retrieve the data from a plurality of data stores based on a multi-level search.

12. The network element of claim 7, wherein the rules are dynamically configurable.

* * * * *